Feb. 10, 1959  A. A. LAHTI ET AL  2,873,439
DIGITAL TO ANALOG CONVERTING APPARATUS
Filed July 6, 1954
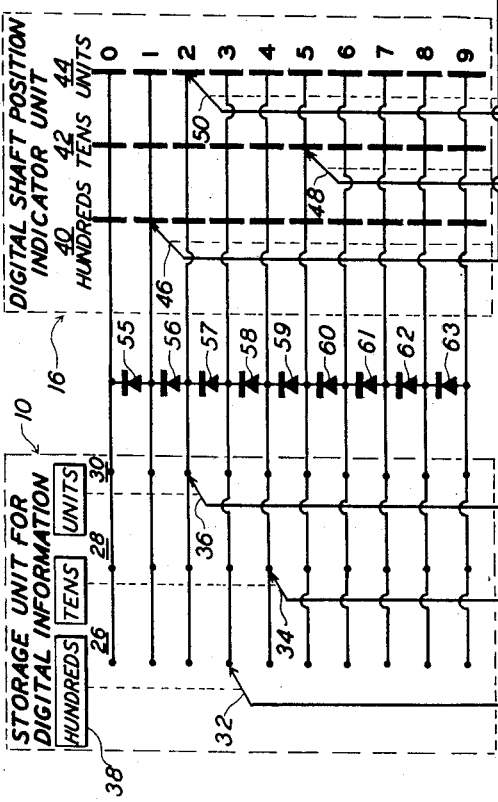
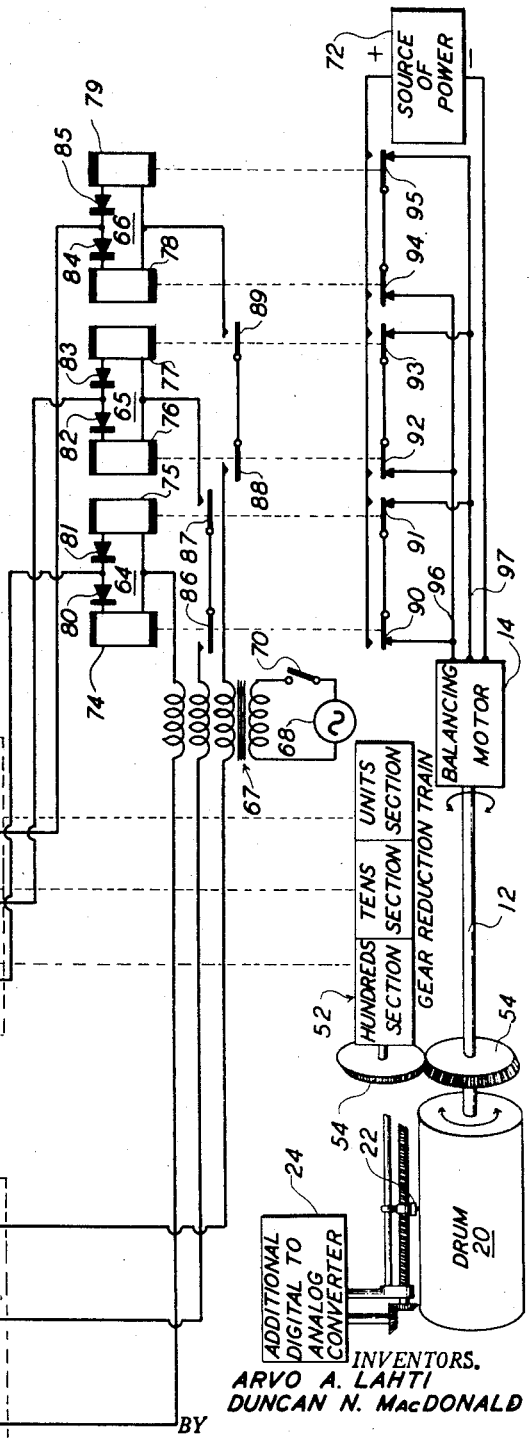
INVENTORS.
ARVO A. LAHTI
DUNCAN N. MacDONALD
BY James B. Christie
ATTORNEY

… …

United States Patent Office 2,873,439
Patented Feb. 10, 1959

2,873,439

DIGITAL TO ANALOG CONVERTING APPARATUS

Arvo A. Lahti, Pasadena, and Duncan N. MacDonald, Arcadia, Calif., assignors, by mesne assignments, to Consolidated Electrodynamics Corporation, Pasadena, Calif., a corporation of California Application July 6, 1954, Serial No. 441,276

5 Claims. (Cl. 340—347)

This invention relates to apparatus for producing a mechanical analog representation of numerical information.

In data processing as well as in other applications, information which is expressed in digital form frequently is converted into a mechanical representation of the digital information. By way of example, numerical information may be reduced to chart form by providing one mechanical representation of the numerical information for positioning the chart and by providing another mechanical representation of the numerical information for positioning a recording pen. In this manner the output of a data-processing machine may be reduced to chart form at a high speed. The conversion from digital information to a mechanical representation of the digital information is sometimes termed "digital-to-analog conversion."

In previous arrangements for converting from a digital to an analog value, the digital information is first converted to an analog voltage and then the analog voltage is applied to a servo system to position it in accordance with the voltage.

The present invention performs such a conversion directly, without converting the digital information to an analog voltage.

In a preferred embodiment of the invention, numerical information is registered in a selector storage unit which comprises a switching arrangement. A second selector switching arrangement is coupled to a movable element which provides an analog representation, and this switching arrangement registers numerical information representative of the position of the movable element. The numerical information which is registered in the two switching arrangements is compared, and polarity-sensitive relay means is actuated in accordance with the relative magnitudes of the numbers which are registered in the two switching arrangements so as to cause the movable element to move and actuate the second switching arrangement until the digital information which is registered in the two switching arrangements is the same.

Such an arrangement serves to convert digital information to a mechanical analog function without providing an intermediate electrical analog function of the digital information. Thus, the apparatus of the invention is of more simple and more reliable construction than that of previously known converters.

The invention is explained with reference to the drawings, in which:

Fig. 1 is a block diagram illustrating the invention, and

Fig. 2 is a schematic diagram showing a preferred embodiment of the invention.

With reference to Fig. 1, a storage unit 10 serves to register digital information which is to be converted to a mechanical analog function. By way of example, digital information may be applied to the storage unit 10 from the output of a data-processing system. In the alternative, the digital information may be registered in the storage unit 10 by manually-actuated switches.

A mechanical analog representation of the digital information which is registered in the storage unit 10 is provided by a rotatable shaft 12 which is positioned by a balancing motor 14. A digital shaft position indicator 16 serves to register digital information representative of the position of the movable shaft 12.

A comparator 18 serves to compare the numerical information which is registered in the storage unit 10 and in the shaft position indicator 16, and it serves to actuate the balancing motor and hence the shaft 12 so as to cause the numerical information which is registered in the shaft position indicator unit to be the same as the numerical information which is registered in the storage unit.

Fig. 2 shows a preferred embodiment of the apparatus in Fig. 1, and it illustrates the use of the converting apparatus in a data-plotting arrangement wherein a drum 20 is positioned by one digital-to-analog converter and a recording pen 22 is positioned by an additional digital-to-analog converter 24. The converter 24 may be the same as the converter shown in the schematic drawing of Fig. 2, or it may be any other desired arrangement for providing a mechanical analog position which corresponds to digital information which is applied to the converter.

The storage unit 10 comprises a set of three selector switches 26, 28 and 30. Each selector switch is provided with ten contacts for representing the digits 0 to 9, and the movable arms 32, 34 and 36 of the switches are positioned in accordance with the numerical information which is to be converted to an analog shaft position. The switches in the storage unit may be actuated in any desired manner. In order to simplify the present disclosure, the switches are illustrated as being manually-actuated, such as by operation of the actuator 38 for the selector switch 26.

Thus, numerical information may be registered in the storage unit 10 by positioning the movable arms 32, 34 and 36 so that the registration in the switch 26 represents the hundreds digit of the number, the registration in the switch 28 represents the tens digit of the number, and the registration in the switch 30 represents the units digit of the number.

The digital shaft position indicator unit 16 is provided with three selector switches 40, 42 and 44 which correspond to the selector switches in the storage unit. The movable arms 46, 48 and 50 of the indicator unit are positioned by a gear reduction train 52. The gear reduction train is a three-section arrangement with a ten-to-one reduction being provided between each section so that it provides a units, tens and hundreds representation of the rotation of the shaft 12. The gear reduction train is coupled to the shaft 12 by a pair of gears 54. The units section of the gear reduction train serves to position the movable arm 50 of the units switch section, the tens section of the gear reduction train serves to position the movable arm 48 of the tens switch section, and the hundreds section of the gear reduction train serves to position the movable arm 46 of the hundreds switch section of the indicator switching arrangement.

The three switches in the digital shaft position indicator unit and the gear reduction train may be any suitable arrangement for providing a registration of digital information representing the position of the shaft 12. By way of example, this may be a three-section commutator-type contact arrangement with the contacts in each section being disposed in circular configuration and with a gear reduction ratio of ten-to-one between each section. With such an arrangement, the contacts which are engaged by the movable arms should be elongated and closely spaced, as illustrated in Fig. 2, so as to provide circuit continuity while the apparatus is in operation. In the alternative, the switches may be stepping switches coupled to the gear reduction train so as to provide the required units, tens and hundreds stepping action.

The contacts of the switches in the storage unit and in the indicator unit which represent the same digit are interconnected. A series of unidirectional conductors, such as the diodes 55 to 63, is provided, with the respective unidirectional conductors being connected between the respective sets of switch contacts which represent successive digits.

Three sets of polarity-sensitive relay units 64, 65 and 66 are connected to the movable arms 46, 48 and 50 of the switches in the position indicator unit, and they are coupled through the secondary windings of a transformer 67 to the movable arms 32, 34 and 36 of the switches in the storage unit. The primary winding of the transformer is connected to a source 68 of alternating current through a switch 70.

Thus, when the switch 70 is closed, alternating current is applied to the polarity-sensitive relay units through the switches in the storage unit, part or all of the series of unidirectional conductors 55 to 63, and the switches of the indicator unit, with the polarity of the current which is applied to the respective polarity-sensitive relay units being determined by the relative magnitudes of the hundreds, tens and units digits which are registered in the storage unit 10 and in the indicator unit 16. If the numbers which are registered in the storage unit and in the indicator unit are the same, both the positive and the negative half-cycles of the alternating current are applied to each of the three polarity-sensitive relay units.

The polarity-sensitive relay units are arranged to operate in sequence, with the relay unit 64 being actuated first, then the relay unit 65, and then the relay unit 66. They serve to control the application of power from a source 72 to the balancing motor 14 so as to cause the shaft 12 to rotate until the numerical information in the indicator unit is the same as that which is registered in the storage unit.

The polarity-sensitive relay units 64 to 66 comprise six relays, 74 to 79, and six unidirectional conductors, such as diodes 80 to 85. Each polarity-sensitive relay unit comprises a pair of relays, such as the pair 74, 75, and a pair of unidirectional conductors, such as the pair of diodes 80, 81, is connected in series between each relay pair. The junctions between the respective pairs of unidirectional conductors are connected to the movable arms 46, 48 and 50 of the switches in the indicator unit.

With this arrangement, the polarity of the signal which energizes each of the polarity-sensitive relay units is determined by the relative settings of the corresponding switch elements in the storage unit and in the indicator unit. If the digit in the storage unit is larger than the corresponding digit in the indicator unit, positive half-cycles of the alternating current are passed by the portion of the series of unidirectional conductors 55 to 63, which interconnect the two sections of the storage and indicator units, and the left-hand relay of the pair which constitute a polarity-sensitive relay unit is energized. If the digit in the storage unit is less than the corresponding digit in the indicator unit, negative half-cycles of the alternating current are passed by the portion of the series of unidirectional conductors 55 to 63 which interconnect the two sections of the storage and indicator units, and the right-hand relay of the pair which constitute a polarity-sensitive relay unit is energized. If the digit in the indicator unit is the same as the corresponding digit in the storage unit, both the positive and the negative half-cycles of the alternating current are applied to the corresponding polarity-sensitive relay unit, and both of the relays of the pair which constitute the polarity-sensitive relay unit are energized.

The relays 74 to 79 are sufficiently slow-acting that they will not release their armatures between the successive half-cycles of the current which energizes them.

The relays 74 to 77 are provided with armatures 86 to 89 which serve to control the sequence of operation of the polarity-sensitive relay units. Both of the relays 74 and 75 must be energized so that their armatures 86 and 87 engage the back contacts before either of the relays 76 and 77 may be energized. In the same manner, both of the relays 76 and 77 must be energized so that their armatures 88 and 89 engage their back contacts before the relays 78 and 79 may be energized.

The relays 74 to 79 are also provided with armatures 90 to 95 which serve to control the application of power from the source 72 to the balancing motor 14. The positive terminal of the source of power 72 may be connected to one or the other of the leads 96 and 97, and the direction of rotation of the balancing motor is determined by the lead which is energized.

The balancing motor may be any suitable device for selectively providing two directions of rotation in response to the energization of either of two leads. By way of example, the balancing motor may be an electric motor having a pair of windings, with the direction of rotation of the motor being determined by the direction of flow of current through either one of the windings.

In operation, the selector arms of the storage unit 10 are set to engage contacts designating digital information which is to be converted to an analog function represented by the position of the shaft 12. As illustrated in Fig. 2, the storage unit is set to represent the number 342. In order to illustrate the operation of the invention, the indicator unit is shown with the number 152 registered in it.

When the switch 70 is closed, an alternating current is applied through the transformer 677 to the converter, and the positive half-cycles of the current are conveyed through the unidirectional conductors 57, 56, and 80 to energize the left-hand relay 74. The armatures 86 and 90 of this relay then engage their back contacts. The armature 90 causes energy from the source 72 of power to be applied to the lead 97 so that the balancing motor rotates in one direction. As the shaft rotates, the selector arm 46 in the indicator unit is moved until it engages the switch contact which represents the digit 3.

Since the circuit between the arms 32 and 46 of the storage and indicator units does not include any unidirectional conductors now, both positive and negative half-cycles of the alternating current are applied to the polarity-sensitive relay unit 64. The next negative half-cycle of the alternating current energizes the right-hand relay 75 so that its armatures 87 and 91 engage their back contacts. Operation of the armature 91 breaks the circuit between the source 72 of power and the balancing motor so that it is not energized for a short time.

The alternating current is now applied through the armatures 86 and 87 to the polarity-sensitive relay unit 65. The next negative half-cycle of the alternating current is conveyed through the uni-directional conductors 59 and 83 to energize the right-hand relay 77, and its armatures 89 and 93 engage their back contacts. This serves to energize the lead 96 so that the balancing motor rotates in the other direction until the selector arm 48 moves to the switch contact which designates the digit 4, whereupon the relay 76 is energized by the next positive half-cycle of the alternating current. Its two armatures 88 and 92 contact their back contacts, and the operation of the armature 92 serves to de-energize the balancing motor again.

The alternating current is now applied through the operated armatures 88 and 89 to the polarity-sensitive relay unit 66. Since the units digits in the storage and indicator units are the same, both the negative and positive half-cycles of the alternating current are applied to the polarity-sensitive relay unit and both the relays 78 and 79 are energized. This serves to cause the armatures 94 and 95 to engage their back contacts. The circuit between the source of power 72 and the balancing motor remains open and no further rotation of the shaft results.

Thus, the shaft 12 and hence the drum 20 have been caused to rotate from a position representing the number 152 to a position representing the number 342. The shaft 12 and the drum 20 provide a mechanical analog representation of the digital information which is stored in the storage unit.

Since the apparatus does not require the production of an analog voltage representative of the shaft position, it is of simple construction and requires a minimum of upkeep.

We claim:

1. Digital-to-analog converting apparatus comprising a first switching means for storing digital information, a movable element for providing an analog representation of the stored digital information, a second switching means coupled to the movable element for registering digital information representative of the position of the movable element, comparator means coupled to the first and second switching means and including a source of alternating voltage and a plurality of unidirectional conductors for passing a signal of one polarity through both the first and second switching means when the number which is registered in the first switching means is larger than the number which is registered in the second switching means and for passing a signal of the other polarity through both the first and second switching means when the number which is registered in the first switching means is smaller than the number which is registered in the second switching means, and polarity-sensitive relay means responsive to the signal passed by the comparator means for controlling the movable element and causing it to move so as to cause the digital information which is registered in the second switching means to be the same as the digital information which is registered in the first switching means.

2. Digital-to-analog converting apparatus comprising a first switching means for storing digital information, a movable element for providing an analog representation of the stored digital information, a second switching means coupled to the movable element for registering digital information representative of the position of the movable element, unidirectional conductor and a source of alternating voltage means coupled to the first and second switching means for passing a signal of one polarity through both the first and second switching means when the number which is registered in the first switching means is larger than the number which is registered in the second switching means and for passing a signal of the other polarity through both the first and second switching means when the number which is registered in the first switching means is smaller than the number which is registered in the second switching means, and for passing a signal of both polarities when the said numbers are the same, and polarity-sensitive relay means responsive to the signal passed by the unidirectional conductor means through both the first and second switching means for controlling the movable element and causing it to move so as to cause the digital information which is registered in the second switching means to be the same as the digital information which is registered in the first switching means.

3. Digital-to-analog converting apparatus comprising a first switching means for storing digital information and having a series of ten contacts for each digit to be stored, a movable element for providing an analog representation of the stored digital information, a second switching means coupled to the movable element for registering digital information representative of the position of the movable element and having contacts corresponding to those of the first switching means, conductive means interconnecting the contacts of the first and second switching means which represent the same digit, unidirectional conductive means connected between the conductive means which interconnect the respective sets of switch contacts representing successive digits, relay means which is sensitive to the polarity of the potential which is applied to it for controlling the position of the movable element, and means for applying an alternating voltage through the contacts of the first and second switching means and the unidirectional conductive means to control the operation of the polarity-sensitive relay means and thereby control the position of the movable element.

4. Digital-to-analog converting apparatus comprising a first switching means for storing digital information and having a series of ten contacts and a movable selector for each digit to be stored, a movable element for providing an analog representation of the stored digital information, a second switching means coupled to the movable element for registering digital information representative of the position of the movable element and having contacts and movable selectors corresponding to those of the first switching means, conductive means interconnecting the contacts of the first and second switching means which represent the same digit, unidirectional conductive means connected between the conductive means which interconnect the respective sets of switch contacts representing successive digits, a plurality of sets of polarity-sensitive relay means with the number of sets corresponding to the number of digits which may be registered in the first switching means, means including a source of alternating current and one set of polarity-sensitive relay means interconnecting the corresponding movable selectors in the first and second switching means so that the polarity-sensitive relay means is actuated in accordance with the relative magnitudes of the numbers which are registered in the first and second switching means, and means for controlling the position of the movable element in accordance with the actuated condition of the polarity-sensitive relays to cause the digital information which is registered in the second switching means to be the same as the digital information which is registered in the first switching means.

5. Digital to analog converting apparatus comprising a first switching means for storing digital information, a movable element for representing an analog function of the digital information stored by the first switching means, a second switching means coupled to the movable element for registering digital information representative of the position of the movable element, a plurality of unidirectional conductors serially interconnecting the first and second switching means, a source of alternating current coupled serially with said first and second switching means, and polarity sensitive means responsive to the passage of half-cycles of alternating current from said source through the serially connected first and second switching means and unidirectional conductors for controlling the position of said movable element, whereby the position of the movable element is adjusted until the digital information in the second switching means equals that stored in the first switching means.

References Cited in the file of this patent

UNITED STATES PATENTS

| | | |
|---|---|---|
| 2,124,906 | Bryce | July 26, 1938 |
| 2,476,673 | May | July 19, 1949 |
| 2,630,481 | Johnson | Mar. 3, 1953 |
| 2,676,289 | Wulfsberg | Apr. 20, 1954 |
| 2,685,054 | Brenner et al. | July 27, 1954 |
| 2,685,084 | Lippel et al. | July 27, 1954 |
| 2,792,545 | Kamm | May 14, 1957 |

UNITED STATES PATENT OFFICE

CERTIFICATE OF CORRECTION

Patent No. 2,873,439                              February 10, 1959

Arvo A. Lahti et al.

It is hereby certified that error appears in the printed specification of the above numbered patent requiring correction and that the said Letters Patent should read as corrected below.

Column 5, line 44, after "conductor" insert -- means --; line 45, after "voltage" strike out "means".

Signed and sealed this 2nd day of June 1959.

(SEAL)
Attest:

KARL H. AXLINE
Attesting Officer

ROBERT C. WATSON
Commissioner of Patents